United States Patent [19]

Strait, Jr.

[11] Patent Number: 4,460,243

[45] Date of Patent: Jul. 17, 1984

[54] OPTICAL FIBER CONNECTOR

[75] Inventor: Ross W. Strait, Jr., Madison, Conn.

[73] Assignee: Times Fiber Communications, Inc., Wallingford, Conn.

[21] Appl. No.: 373,109

[22] Filed: Apr. 29, 1982

[51] Int. Cl.³ .............................................. G02B 7/26
[52] U.S. Cl. ................................ 350/96.21; 350/96.20
[58] Field of Search .................. 350/96.20, 96.21, 96.22

[56] References Cited

U.S. PATENT DOCUMENTS

| 3,880,452 | 4/1975 | Fields | 285/177 |
|---|---|---|---|
| 3,922,064 | 11/1975 | Clark et al. | 350/96.22 |
| 3,984,174 | 10/1976 | Landgreen | 350/96 C |
| 3,989,567 | 11/1976 | Tardy | 156/158 |
| 4,009,931 | 3/1977 | Malsby et al. | 350/96.21 |
| 4,019,241 | 4/1977 | Logan | 350/96.21 X |
| 4,047,796 | 9/1977 | Kao et al. | 350/96.21 |
| 4,050,781 | 9/1977 | Beauhaire | 350/96.21 |
| 4,050,783 | 9/1977 | Tardy | 350/96.21 |
| 4,056,305 | 11/1977 | McCartney et al. | 350/96.21 |
| 4,061,416 | 12/1977 | Stewart | 350/96.21 |
| 4,094,580 | 6/1978 | Cook et al. | 350/96.21 |
| 4,099,832 | 7/1978 | Warner, Jr. | 350/96.21 |
| 4,123,139 | 10/1978 | Sandahl | 350/96.21 |
| 4,132,461 | 1/1979 | Jacques et al. | 350/96.20 |
| 4,158,476 | 6/1979 | McCartney | 350/96.21 |
| 4,161,347 | 7/1979 | Tardy | 350/96.21 |
| 4,183,619 | 1/1980 | Makuch | 350/96.21 |
| 4,184,741 | 1/1980 | Hawk et al. | 350/96.20 |
| 4,201,443 | 5/1980 | Hodge | 350/96.20 |
| 4,201,444 | 5/1980 | McCartney et al. | 350/96.21 |
| 4,217,029 | 8/1980 | Kao | 350/96.21 |
| 4,223,976 | 9/1980 | Zangiacomi et al. | 350/96.21 |
| 4,239,334 | 12/1980 | Johnson | 350/96.21 |
| 4,279,469 | 7/1981 | Forman | 350/96.22 |

FOREIGN PATENT DOCUMENTS

| 0028790 | 5/1981 | European Pat. Off. | 350/96.21 |
|---|---|---|---|
| 52-77736 | 6/1977 | Japan | 350/96.21 |
| 1580061 | 11/1980 | United Kingdom | 350/96.21 |

Primary Examiner—John D. Lee
Attorney, Agent, or Firm—Bacon & Thomas

[57] ABSTRACT

A connector for coupling optical fiber elements includes two connector assemblies, each including a three-pin assembly that forms a precise axial central opening through which an optical fiber to be coupled extends. The fiber is secured within each pin group and terminates flush with the ends of the pins, which pins also terminate flush with each other. The pins of each group are secured together in each connector assembly. One connector assembly includes an alignment sleeve that spans the pin ends where the optical fibers terminate. When the connector assemblies are joined, an interference fit is formed that causes the axial chambers within the pin groups to become axially aligned, and the pin ends in each group abut each other. Means are provided to secure the optical fiber in place in each connector assembly and to couple the assemblies together.

12 Claims, 4 Drawing Figures

4,460,243

OPTICAL FIBER CONNECTOR

TECHNICAL FIELD OF THE INVENTION

The present invention is directed to a connector for precision coupling of optical fibers.

BACKGROUND OF THE PRIOR ART

It is a well known scientific phenomenon that light can be transmitted through a transparent glass fiber whose index of refraction is greater than that of the surrounding medium. The mechanism by which the light is transported through the fiber is commonly referred to as total internal reflection and is based on the fact that beyond a critical angle of incidence, light striking the internal interface of the fiber will not pass through the interface but will be totally reflected back into the fiber.

The practical significance of this phenomenon is that an optical signal can be transmitted with relative clarity along a transparent fiber if means are provided to inhibit attenuation of the light beam in the fiber. The problem of attenuation is particularly acute when two optical fibers are connected. To minimize this problem, a connector for optical fibers must precisely align the two fibers so that the axis of the transmitting fiber is coincident with the axis of the receiving fiber and the ends of each fiber are precisely adjacent to one another. The connector design, then, must preclude radial misalignment, angular misalignment and axial separation of the transmitting and receiving fibers. In addition to providing precise spatial alignment, the connector design must protect the glass fiber from mechanical stress, shock of other physical abuse during assembly, storage, mating and unmating, and usage.

In view of the aforementioned problems, it has been proposed in the prior art to align and couple optical fibers in the interstice between three contiguous elongated cylindrical rigid pins. For example, in U.S. Pat. No. 4,047,796, a connector design is disclosed which employs three precise, contacting cylindrical rods of equal dimensions through which two lengths of optical fiber are threaded from opposite ends through the interstice between the rods until they contact. The fibers are aligned and secured in position by means of a clamp which tightens a compression ring at one end of the rod assembly so that the rods engage and secure the fibers in alignment. Other patents, such as, U.S. Pat. Nos. 4,061,416 and 4,050,781, disclose similar connectors predicated upon the three rod assembly.

One of the major disadvantages inherent in the three rod assemblies of the prior art stems from the fact that connection and disconnection is accomplished by simply releasing the pressure on the rods and inserting or removing the naked optical fiber from the assembly. This procedure increases the potential of damage to the fragile glass fiber due to mechanical and physical stress, while it is unprotected. Accordingly, there exists a need in the art for a freely separable optical fiber connector assembly which does not require exposure of an unprotected optical fiber during mating and unmating, yet permits the fibers to be precisely axially aligned and retained in joined condition.

SUMMARY OF THE INVENTION

This invention relates to a connector for coupling together the ends of two optical fibers in a precise manner that minimizes losses at the connection and that enables the ends of the optical fibers to be protected when the connection is separated.

The connector of the invention is comprised of two connector assemblies. Each connector assembly contains a three-pin sub-assembly to support the end portions of optical fiber that extend from the ends of fiber optic cable to be optically coupled. Each three-pin sub-assembly comprises three, parallel, contiguous, likesize pins that are precisely dimensioned so that when they are rigidly secured together in a contiguous relationship, a precisely defined elongated chamber extends axially through the central space between the pins. Each end portion of optical fiber to be coupled extends through the respective chamber in each sub-assembly and terminates precisely at the proximal ends of the pins in each connector assembly.

The pins comprising each sub-assembly are rigidly secured together in a contiguous relationship to define the chamber for receiving a length of optical fiber in each connector assembly by first retaining means. Second retaining means is provided in each connector assembly for precisely aligning the distal ends of the pins in each sub-assembly so that they co-terminate precisely together. Thermally responsive retaining means is provided in each connector assembly to securely hold each optical fiber within the chamber defined by the three pins in each sub-assembly. The thermally responsive retaining means is preferably positioned circumferentially inwardly of the second retaining means in the connector assembly. The combination of the first and second retaining means and the thermally responsive retaining means in each connector assembly insure that when two connector assemblies are brought together and coupled by their respective coupling means, the chambers within each sub-assembly are precisely axially, radially and angularly aligned so that the ends of the optical fibers extending through each of the chambers is likewise in precise alignment.

The invention, therefore, contemplates a connector structure for enabling the fiber supporting chambers in each sub-assembly to be accurately aligned and supported at the point where the fiber lengths terminate in endwise abutting relationship, while still permitting the connection to be readily and repeatedly separated and reconnected without disturbing the precise nature of the coupling between the ends of the optical fiber.

DETAILED DESCRIPTION OF THE PREFERRED EMBODIMENT

Figure 1:
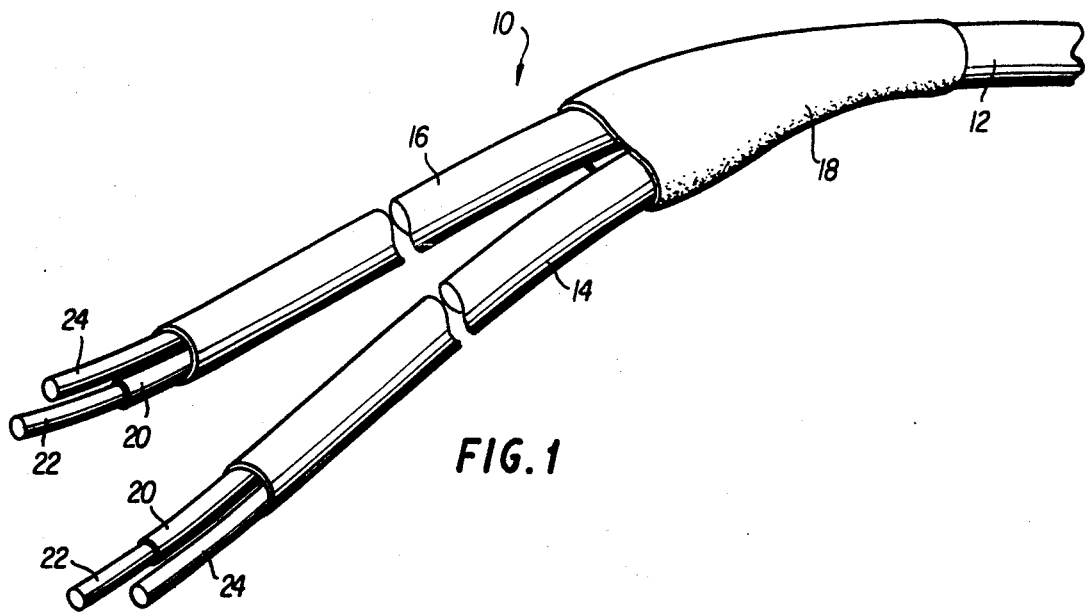
FIG. 1 is a perspective view of a fiber optic cable with various sections of its protective sheaths removed.

Referring to FIG. 1, reference numeral 10 shows, in general, a fiber optic cable which has been partially prepared for use in conjunction with a connector assembly of the invention. The cable 10 has a first protective sheath 12 which encloses a plurality of fiber optic cables wrapped by a second protective sheath as shown at 14 and 16. In partial preparation for inserting one of the optical fibers into a connector assembly, as explained below, a portion of the first protective sheath 12 has been stripped away and a heat shrinkable tubular element 18 has been positioned so that one end of the element 18 is in contact with the first protective sheath 12 and the opposite end of the shrink tube encloses the second protective sheaths 14 and 16 which enclose the fiber optic cables. Interiorly of the protective sheaths 14 and 16 are steel strength members 24, one for each fiber optic cable. The steel strength members 24 are colinearly aligned with optical fibers 22 in order to provide strength and rigidity to the arrangement and protect the fragile glass fiber. The optical fibers 22 are further enclosed by a protective buffer layer 20. In order to prepare the fiber optic cables for connection with a connector assembly, additional lengths of the second protective sheaths 14 and 16 have been removed a predetermined distance from the exposed ends of the optical fibers 22. In addition, a predetermined length of the buffer layer 20 has been removed so as to expose a predetermined length of optical fiber 22.

The basic element of a connector assembly of the invention comprises three, like-size, contiguous, rigid pins referred to as a three-pin sub-assembly. The pins are held in position in a connector assembly by first and second retaining means. The first retaining means for the pins is preferably a rigid, generally cylindrical shaped metal sleeve which surrounds the pins and secures them in a tight, contiguous relationship by exerting a radially compressive force on the pins. The second retaining means which is preferably one or more rigidly, generally cylindrical metal bushings is positioned so as to securely retain and precisely align the distal ends of the pins in each sub-assembly so that they co-terminate precisely together in the connector assembly. There is one three-pin sub-assembly and first and second retaining means in each connector assembly of the invention. Two connector assemblies are coupled together to connect the ends of two optical fibers.

In each connector assembly, the optical fiber is fitted into the interstitial chamber between the three pins of the sub-assembly. The diameter of the chamber is defined by the diameter of the inscribed circle tangent to the circumference of each of the three pins. Because the diameter of the chamber is determined by the diameter of the pins, any diameter optical fiber can be accommodated by careful selection of the diameter of the pins.

Thermally responsive retaining means, preferably in the form of a solder ring, is provided in each connector assembly for securing the optical fiber within the intersticial chamber by preventing axial movement of the fiber within the chamber.

Each connector assembly additionally contains coupling means which enables it to be securely coupled to a mating connector assembly in such a manner that the proximal ends of each three-pin sub-assembly are precisely aligned. Additionally, each connector assembly may contain means to thread the optical fiber into the sub-assembly and to hold and protect the retaining means.

Figure 2:
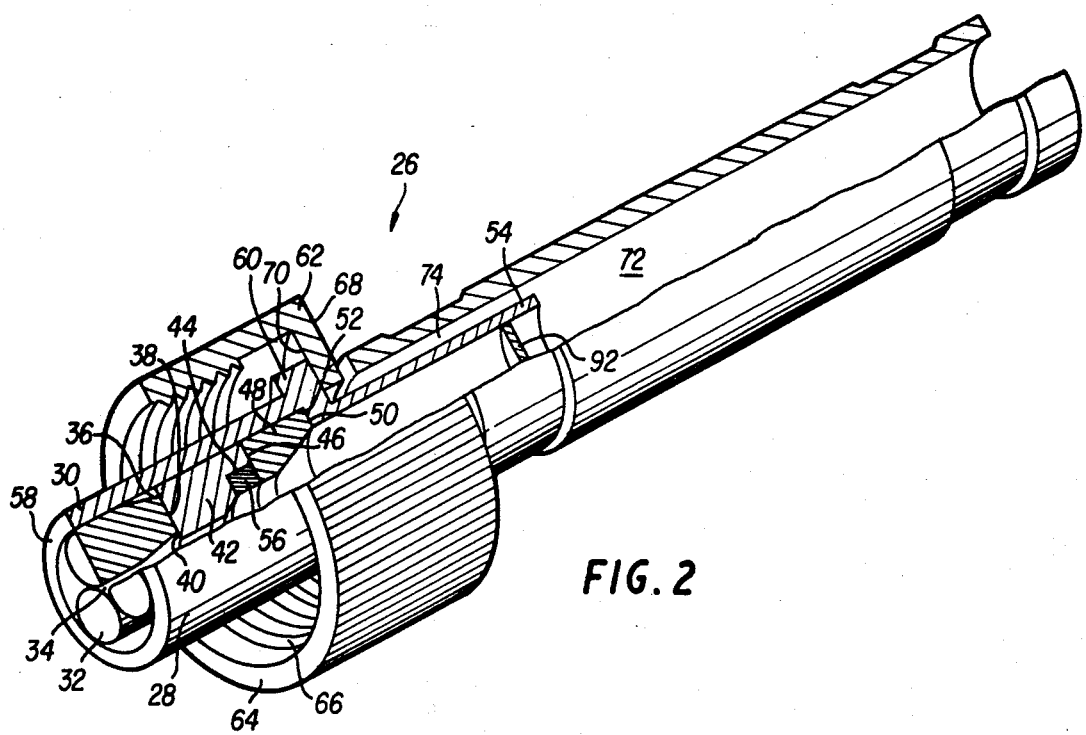
FIG. 2 is a perspective view, in partial cross-section, of a male connector assembly.

FIG. 2 shows a connector assembly of the invention, generally at 26. A metal sleeve 28 is provided with a front portion 30 for housing and retaining a three-pin sub-assembly 32 which defines an intersticial chamber 34 for receiving and protecting an optical fiber inserted therein. The distal end 36 of each pin is tapered so as to assist in acting as a guide for the threading of the optical fiber 22 through the intersticial chamber 34. Each end face 38 of the pin assembly is in a flush, abutting arrangement with a first end face 40 of a bushing 42. The bushing 42 is provided with a notch 44 which extends, circumferentially, around the inside of the bushing 42. A second end face 46 of the bushing 42 is in flush, abutting relationship with a lead-in bushing 48 which has an opposite end face 50 in a flush, abutting engagement with a shoulder 52 of the metal sleeve 28. The shoulder 52 extends circumferentially inwardly and defines a reduced diameter portion 54 of the sleeve 28. The notch 44 of the bushing 42 and the abutting, front face section of the lead-in bushing 48 defines a circumferential groove for receiving a solder ring 56 which extends circumferentially around the length of the notch 44.

The metal sleeve 28 has a forward end portion 58 which extends rearwardly to an increased diameter portion 60 which extends circumferentially outwardly and serves as a stop member for a coupling nut 62. The coupling nut 62 has a front cylindrical portion 64 provided with internal threads 66 adapted to threadedly engage a threaded member of an additional connector assembly as explained below. The rear portion of the coupling nut has a downwardly extending flange 68, an inner face of which will contact the upwardly extending shoulder 60 of the sleeve 28 so as to limit axial movement of the nut 62, towards the front face 58 of the sleeve 28. The reduced diameter portion 54 of the sleeve 28 extends rearwardly, from the shoulder 60, and is received within crimp ring 72. The crimp ring 72 is of slightly larger inside diameter than the outside diameter of the reduced portion 54 of the sleeve 28. The space 74, defined by the interfitting sleeves is designed to receive the steel strength member 24 of an optical fiber cable in a manner to be described below.

Figure 3:
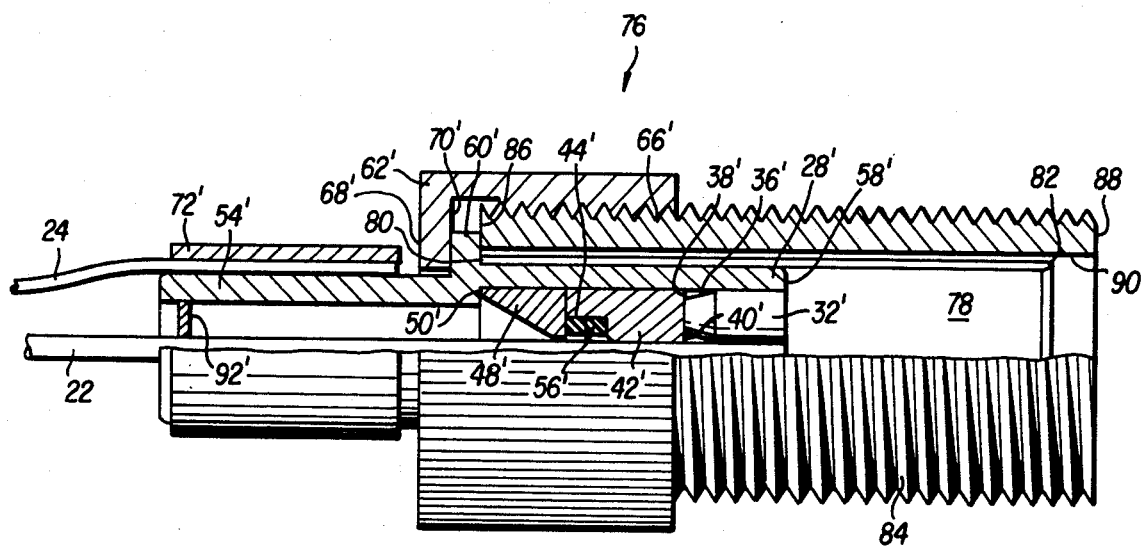
FIG. 3 is a cross-section of a female connector assembly.

FIG. 3 discloses, in cross section, the mating connector assembly, generally at 76. Reference may be made to the foregoing discussion of FIG. 2 for a description of like parts and elements which will be designated by the same reference numeral as shown in FIG. 2 with a prime (') designation. Accordingly, the discussion of FIG. 3 is limited to those parts and elements which differ in structure and/or function from those described with respect to FIG. 2.

Concentric with the sleeve 28' is an alignment sleeve 78. The sleeve 78 is adapted to receive the sleeve 28 of the connector assembly shown in FIG. 2 in order to position the two, separate sub-assemblies, each of which has an optical fiber 22 secured within, in precise alignment. A first end portion 80, of the sleeve 78, abuts the shoulder portion 60' of the sleeve 28'. A second end portion 82 is provided with an opening, for receiving the sleeve 28 of the mating connector assembly shown in FIG. 2. Concentric with the sleeve 78 is a threaded coupling 84. The coupling 84 is threadedly engaged with the coupling nut 62' until a first end portion 86 contacts the shoulder portion 60' of the sleeve 28'. A second end portion 88 is provided with an opening 90 for receiving the sleeve 28 of the mating connector assembly and for allowing access to the alignment sleeve 78 when the two connector assemblies are not engaged.

An "O" ring 92 and 92' is positioned in the interior of the reduced diameter portions 54 and 54' of the sleeves 28 and 28' in both connector assemblies 26 and 76. The "O" ring serves as a guide for receiving the optical fiber 22.

Figure 4:
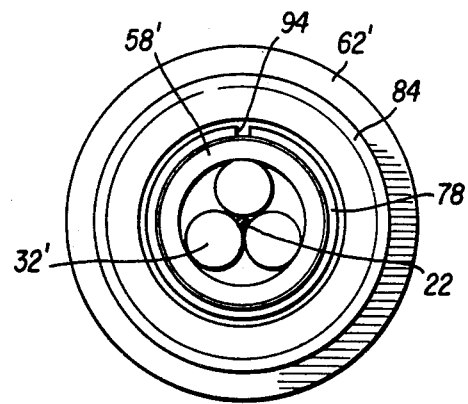
FIG. 4 is an end view of the connector assembly of FIG. 3.

FIG. 4 is an end view, looking to the left, of the connector assembly 76 shown in FIG. 3. FIG. 4 shows the compact, concentricity of the connector assembly with the optical cable 22 situated in the space provided by the three-pin arrangement 32'. Also shown is the split, expansion area 94 of the alignment sleeve 78.

When the cables 22 have been accurately positioned by each connector assembly 26 and 76, the assemblies may then be joined so as to accurately align the disparate ends of each cable 22. This step is achieved by coupling the assembly 76. This merely involves sliding the sleeve 28, of assembly 26, into the alignment sleeve 78. The sleeve 28 is received within the sleeve 78, of the assembly 76, until the end portion 82 of the sleeve 78 abuts the shoulder portion 60 of the assembly 26. At the same time, the threaded coupling 84 is in engagement with the threads 66 along the interior of the coupling nut 62 of the assembly 26. The coupling nut 62 of the assembly 26 continuously advances the threaded coupling 84 until the end portion 82 of the sleeve 78 bottoms against the shoulder member 60 of the sleeve 28 in assembly 26. Due to the precision of each assembly 26 and 76, each optical fiber is then aligned with minimal optical loss.

In order to prepare the cable 10 of FIG. 1 for connection with the assemblies 26 and 76 of FIGS. 2 or 3, respectively, the following procedure is preferred. Cable 12 is first cut so that an end face (not shown) is prepared with all components flush with each other. A section of heat shrinkable tubing 18, of initially larger inside diameter than the outer protective sheath 12 of cable 10, is positioned around the cable a predetermined distance from the end of the cable which is to be connected to a connector assembly. After the shrink tube 18 is in place, a predetermined length of the outer protective sheath 12 is removed. This exposes the strength members 24, buffer 20 and cable 22. The buffer 20 is then removed from the cable and the cable 22 is carefully cleaned. After cleaving the ends of the glass fiber, the protective sheaths 14 and 16 are inserted over each combination of optical fiber 22 and strength member 24.

The protective sheaths 14 and 16 are positioned so that one end abuts the outer protective sheath 12 and the opposite end portion exposes the inner cable components 22 and 24. The heatable shrink tube 18 is then positioned around the junction of the protective sheaths 12, 14 and 16 and is then heated so as to shrink and tightly hold in place the sheathing arrangement previously discussed. The strength members 24 are then trimmed back a predetermined distance from the exposed end of the optical fiber 22.

Each optical fiber 22 is now ready for connection to a connector assembly. For ease of explanation, the connection will be described with reference to optical cable element 14, since it is understood that an identical procedure is employed to connect optical cable element 16 and any number of other optical cable elements with a connector assembly. A crimping ring 72 is positioned around a lower portion of the inner sheath member 14. Once the crimp ring 72 is in place, the coupling nut 62 is then positioned around the crimp ring and the glass fiber 22 is threaded through sleeve 28 into the chamber provided by the three-pin sub-assembly. By holding the sleeve within the crimp ring, the strength member 24 is positioned on the outside of the reduced diameter portions 54 of the sleeve 28. The crimp ring 72 is then moved forward so as to enclose the strength member 24 between section 54 of the sleeve and the crimp ring and to place the optical fiber in its proper axial position within the three-pin sub-assembly, flush with the ends of the pins at front face 58 of the sleeve 28. To insure that the optical fiber is positioned precisely, it is preferred to advance the fiber until it visibly extends through the front face of the sub-assembly and then push it back into position with a precisely dimensioned ball bearing. The front face 58 of the sleeve 28 is then cleaned and, by engaging the front section 30 of the sleeve 28 with a heating element (not shown), the solder ring 56 is melted and secures the optical fiber 22 within the chamber provided by the three-pin arrangement 32 located within the sleeve 28. After the solder is allowed to cool and solidify around the fiber 22, flux residue may be removed from the face of the connector assembly. The crimp ring 72 is then clamped into place so as to securely hold the strength member 24 in position between the sleeve and the crimp ring and at the same time connecting with crimp ring 72 and the sleeve in a tight, interference fit.

A separate optical cable may be similarly positioned within the connector assembly 76 of FIG. 3 and the assemblies 26 and 76 may then be joined to provide an optical fiber connector which connects two fiber optical cables with minimal optical loss, e.g., about 2 db or less, in an uncomplicated and easy-to-assemble manner.

While the invention has now been described in terms of certain preferred embodiments, the skilled worker in the art will recognize that various changes, omissions, modifications, and substitutions may be made without departing from the spirit thereof. For example, while the invention has been specifically illustrated with reference to an optical cable containing two cable elements each having one optical fiber and one strength member, numerous other cables having a greater or lesser number of cable elements each having a greater or lesser number of strength members can be effectively connected by the connector of the invention. Accordingly, it is intended that the scope of the present invention be limited solely by that of the following claims.

I claim:

1. A connector for coupling the ends of two lengths of optical fiber in contiguous, aligned position comprising two connector assemblies, each connector assembly comprising:
   (a) a three-pin sub-assembly comprising three like-size, generally cylindrical, rigid pins extending parallel to each other in contiguous relationship, said pins having a diameter such that an inscribed circle extending tangent to the pin circumferences in the interior space between the pins substantially corresponds to the diameter of a length of optical fiber;
   (b) first retaining means for securely retaining the pins of the sub-assembly in contiguous relationship, the interior space extending between the circumferences of the pins defining a chamber for receiving a length of optical fiber;
   (c) second retaining means for aligning the distal ends of the pins of the sub-assembly so that they co-terminate precisely together;
   (d) thermally responsive retaining means positioned circumferentially inward of said second retaining means for securing an optical fiber within the chamber defined by the three pins of the sub-assembly; and
   (e) coupling means for connecting the connector assembly to its mating connector assembly.

2. A connector according to claim 1, said first retaining means comprising a rigid metal sleeve circumferentially surrounding said pins and exerting a radial compressive force upon said pins.

3. A connector according to claim 1, said second retaining means comprising a first bushing having a first end portion in abutting relationship with said distal ends of said pins.

4. A connector according to claim 3, said second retaining means further comprising a second bushing having a first end portion in abutting relationship with a second end portion of said first bushing.

5. A connector according to claim 4, said second bushing having a second end portion in abutting relationship with a circumferentially inwardly extending shoulder provided on said first retaining means.

6. A connector according to claim 5, said thermally responsive retaining means positioned in a circumferentially extending notch of said second retaining means and bounded on a first side by a lip portion of said notch and bounded on a second side by said second bushing.

7. A connector according to claim 1, one of said two connector assemblies further comprising alignment means concentric with said first retaining means.

8. A connector according to claim 7, further comprising threaded coupling means circumferentially surrounding and concentric with said alignment means, said threaded coupling means being adapted to be threadedly engaged with mating coupling means of said other connector assembly.

9. A method for coupling the end of a length of optical fiber cable components, including an optical fiber and a strength member, to a connector assembly, comprising:
   (a) positioning a crimp ring arund said components;
   (b) threading said fiber through a connector body;
   (c) positioning said strength member between said crimp ring and said connector body;
   (d) heating said connector body and thereby melting a thermally responsive element around said fiber; and
   (e) crimping said crimp ring around said connector body and securing said strength member therebetween.

10. A method according to claim 9, including; cooling and solidifying said melted element thereby securing said fiber within said connector body.

11. A method according to claim 9, including;
   (f) removing a predetermined length of a first protective sheath from around said cable components; and,
   (g) positioning a second protective sheath around said components whereby a predetermined length of said components are exposed.

12. A method according to claim 11, further including; protecting the junction of said first and second sheaths by positioning a heat responsive tube around said junction, heating said tube and shrinking it around said junction.

* * * * *